United States Patent
Kaede

(10) Patent No.: US 12,154,385 B2
(45) Date of Patent: Nov. 26, 2024

(54) INFORMATION PROCESSING APPARATUS AND METHOD AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventor: Ikumi Kaede, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/735,120

(22) Filed: May 3, 2022

(65) Prior Publication Data

US 2022/0262166 A1 Aug. 18, 2022

Related U.S. Application Data

(63) Continuation of application No. 16/802,513, filed on Feb. 26, 2020, now Pat. No. 11,373,454.

(30) Foreign Application Priority Data

May 27, 2019 (JP) ................ 2019-098790

(51) Int. Cl.
G06V 40/60 (2022.01)
G06K 7/10 (2006.01)
G06V 40/16 (2022.01)

(52) U.S. Cl.
CPC .......... G06V 40/67 (2022.01); G06K 7/10297 (2013.01); G06K 7/10366 (2013.01); G06V 40/166 (2022.01); G06V 40/172 (2022.01)

(58) Field of Classification Search
CPC .......... G06K 9/00912; G06K 9/00288; G06K 7/10297; G06K 7/10366; G06K 9/00255; G06K 9/00899
See application file for complete search history.

(56) References Cited

U.S. PATENT DOCUMENTS

2007/0086761 A1* 4/2007 Okamoto ............... H04N 23/71
396/14
2007/0248281 A1* 10/2007 Super ................... G06V 40/161
382/275

(Continued)

OTHER PUBLICATIONS

"Office Action of Japan Counterpart Application", issued on Jun. 4, 2024, with English translation thereof, p1-p3.

(Continued)

*Primary Examiner* — Dhaval V Patel
(74) *Attorney, Agent, or Firm* — JCIPRNET

(57) ABSTRACT

There is provided an information processing apparatus, comprising: a processor, configured to: receive image data from a camera; cause a display to display the image data while the image data is being received from the camera; cause the display to display a first frame to guide a user to place a living face of the user in a first predetermined shooting area of the camera; cause the display to display a second frame to guide a user to place a non-living target object in a second predetermined shooting area of the camera; instruct, in response to a determination that the living face is not placed as guided, the user to place the living face as guided; and instruct, in response to a determination that the target object is not placed as guided, the user to place the target object as guided.

18 Claims, 12 Drawing Sheets

(56) References Cited

U.S. PATENT DOCUMENTS

2009/0167883 A1* 7/2009 Nozaki ............... H04N 23/611
                                                  348/222.1
2017/0351909 A1* 12/2017 Kaehler ............... G06K 9/6257
2018/0376072 A1* 12/2018 Kwon .................. G06V 40/171
2019/0179954 A1*  6/2019 Mardikar ............. H04W 12/06
2019/0340422 A1* 11/2019 Alvin .................. G06V 30/224
2020/0045226 A1*  2/2020 Lertsumruaypun .... G06V 30/40

OTHER PUBLICATIONS

"Office Action of Japan Counterpart Application", issued on Feb. 13, 2024, with English translation thereof, p1-p6.

* cited by examiner

INFORMATION PROCESSING APPARATUS AND METHOD AND NON-TRANSITORY COMPUTER READABLE MEDIUM STORING INFORMATION PROCESSING PROGRAM

CROSS-REFERENCE TO RELATED APPLICATIONS

This is a continuation application of and claims the priority benefit of a prior application Ser. No. 16/802,513 filed on Feb. 26, 2020, now allowed. The prior application Ser. No. 16/802,513 is based on and claims priority under 35 USC 119 from Japanese Patent Application No. 2019-098790 filed May 27, 2019. Each of the above application(s) is hereby expressly incorporated by reference, in its entirety, into the present application.

BACKGROUND

Technical Field

The present disclosure relates to an information processing apparatus, a method and a non-transitory computer readable medium storing an information processing program.

Related Art

Japanese Unexamined Patent Application Publication No. 2012-068924 discloses an authentication system that authenticates an IC card including a memory that stores facial image data. In the IC card, data is encrypted such that a password specified in advance or data associated with the password is used as an encryption key. The authentication system for the IC card includes an imaging unit that images the face of a person subjected to authentication, an antenna that transmits electromagnetic waves to and receives electromagnetic waves from the IC card, a detector that detects the IC card based on the electromagnetic waves transmitted and received via the antenna, a reader that reads the facial image data from the IC card detected by the detector, a comparer that compares the image of the face of the person subjected to authentication, which is captured by the imaging unit, against the facial image data read by the reader, and an output unit that outputs a comparison result obtained by the comparer. The imaging unit images the face of the person subjected to authentication after the detector has detected the IC card. The reader acquires the password after the imaging unit has imaged the face of the person subjected to authentication, decrypts the data in the IC card based on the password, and acquires the facial image data stored in the IC card if the data is decrypted successfully.

SUMMARY

Aspects of non-limiting embodiments of the present disclosure relate to obtaining image data of a living face and a non-living target object using a camera.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus, comprising: a processor, configured to: receive image data from a camera; cause a display to display the image data while the image data is being received from the camera; cause the display to display a first frame to guide a user to place a living face of the user in a first predetermined shooting area of the camera; cause the display to display a second frame to guide a user to place a non-living target object in a second predetermined shooting area of the camera; instruct, in response to a determination that the living face is not placed as guided, the user to place the living face as guided; and instruct, in response to a determination that the target object is not placed as guided, the user to place the target object as guided.

BRIEF DESCRIPTION OF THE DRAWINGS

Exemplary embodiments of the present disclosure will be described in detail based on the following figures, wherein.

DETAILED DESCRIPTION

First Exemplary Embodiment

A technology according to each embodiment of the present disclosure is described below in detail with reference to the drawings. An information processing apparatus according to each exemplary embodiment includes, but is not limited to, a camera that shoots a photo and/or a video, a monitor that displays what is in the shooting area of the camera and what is being shot by the camera, and a near field communicator that acquires information from an IC chip. The information processing apparatus may acquire information from a camera and a near field communicator installed at different places and transmit an image to a monitor installed at a different place to display the image. The camera may shoot a photo or a video. A video typically comprises a plurality of still images. As far as the present disclosure is concerned, the term "video" is not intended to be limiting to a video that exists as a video file or a video recorded for later viewing. Furthermore, a plurality of photos that are captured and/or presented consecutively to capture and/or present a motion may also be regarded as a video.

Figure 1:
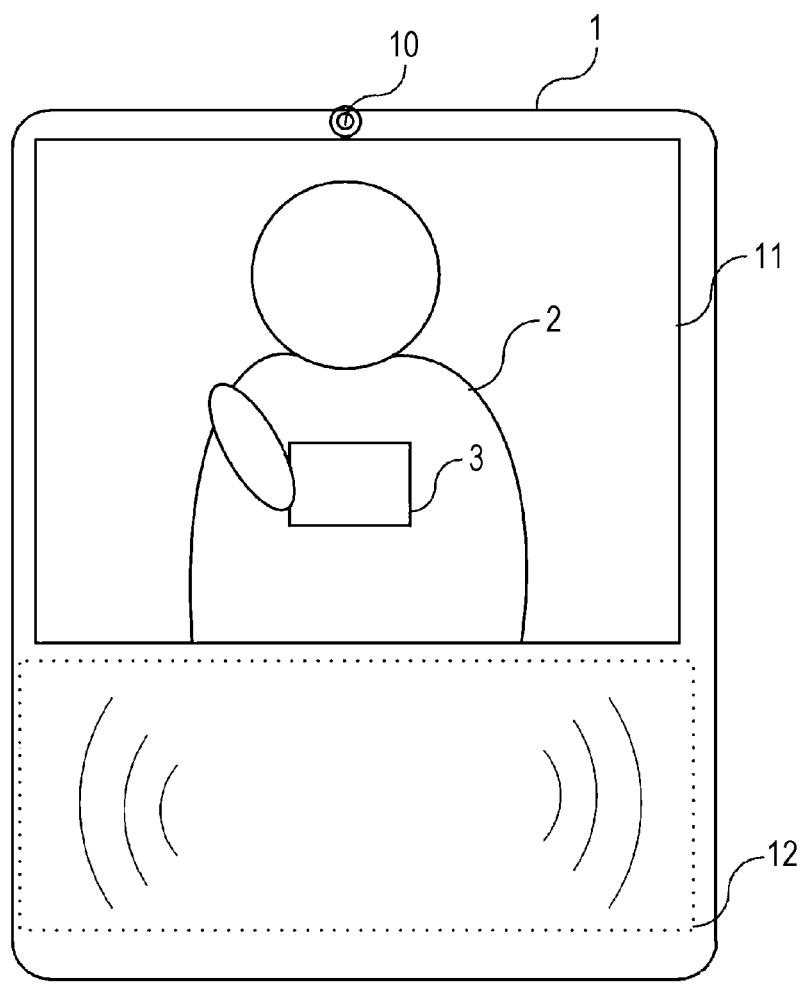
FIG. 1 is a schematic diagram of an example of an information processing apparatus, for describing authentication of a person according to each exemplary embodiment.

FIG. 1 is a schematic diagram of an example of an information processing apparatus 1, for describing authentication of a person according to each exemplary embodiment. The information processing apparatus 1 includes a camera 10, a monitor 11, and a near field communicator 12. For example, the information processing apparatus 1 according to each exemplary embodiment is, but not limited to, a mobile terminal such as a smartphone or a tablet carried by a person 2. The information processing apparatus 1 may be a terminal such as a server connected to the camera 10, the monitor 11, and the near field communicator 12.

An object 3 carried by the person 2 has an integrated circuit (IC) chip. The IC chip stores personal information of the person 2 for use in individual identification, or information necessary to access the personal information of the person 2 that is stored in an external database. Examples of the personal information include a name, a date of birth, an address, an ID number, a preregistered image of the person 2, and a preregistered image of the object 3.

The camera 10 is provided at an upper central portion of the information processing apparatus 1 to shoot a photo or video of the person 2 facing the monitor 11. In each exemplary embodiment, the camera 10 is provided at the upper central portion of the information processing apparatus 1 but may be provided, for example, at the center or a lower central portion of the information processing apparatus 1 depending on environments. In each exemplary embodiment, the camera 10 is, but not limited to, a monocular camera. The camera 10 may be a different type of camera such as a stereoscopic camera.

The monitor 11 displays real-time feedback of what is present in the shooting area of the camera 10. Examples of the monitor 11 include a liquid crystal monitor, a cathode ray tube (CRT) monitor, and a flat panel display (FPD) monitor.

The near field communicator 12 performs near field communication by transmitting radio waves to the IC chip on the object 3 to acquire information from the IC chip. The near field communicator 12 may have a function of writing information in the IC chip. The near field communicator 12 according to each exemplary embodiment is provided below the camera 10 and the monitor 11 but may be provided, for example, above or on the side of the monitor 11.

Figure 2:
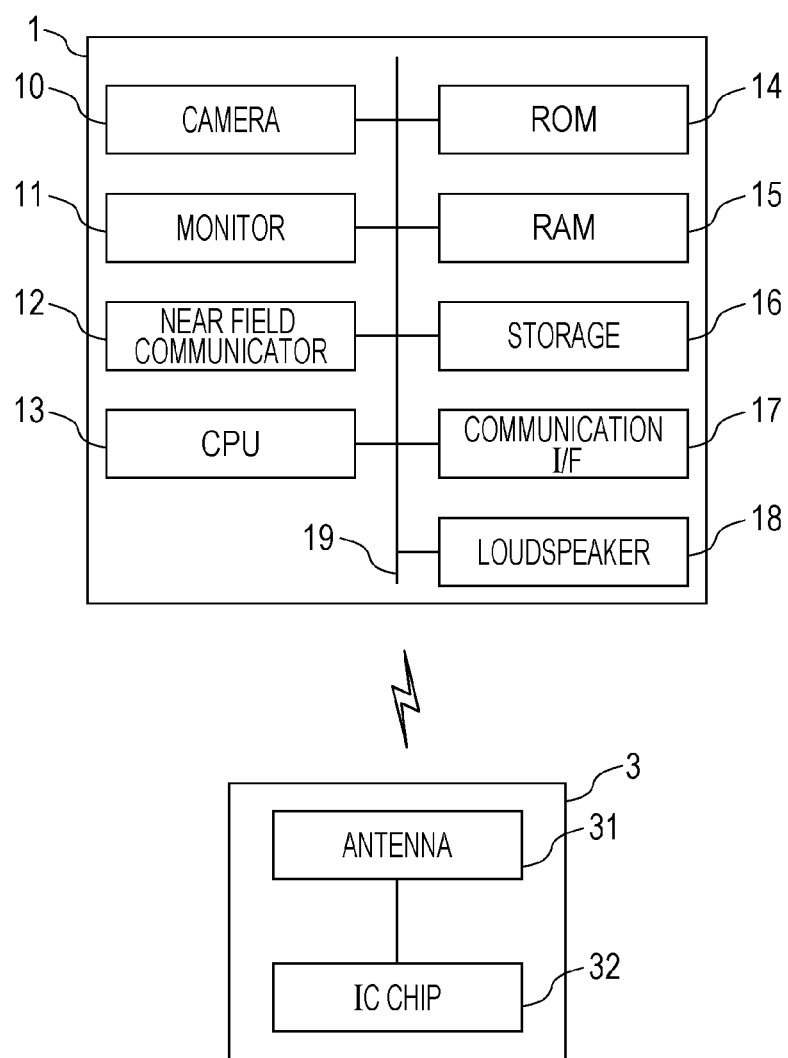
FIG. 2 is a block diagram illustrating an example of the hardware configuration of the information processing apparatus according to each exemplary embodiment.

FIG. 2 is a block diagram illustrating an example of the hardware configuration of the information processing apparatus 1 according to each exemplary embodiment. As illustrated in FIG. 2, the information processing apparatus 1 according to each exemplary embodiment includes the camera 10, the monitor 11, the near field communicator 12, a central processing unit (CPU) 13, a read only memory (ROM) 14, a random access memory (RAM) 15, a storage 16, a communication interface (communication I/F) 17, and a loudspeaker 18. The camera 10, the monitor 11, the near field communicator 12, the CPU 13, the ROM 14, the RAM 15, the storage 16, the communication I/F 17, and the loudspeaker 18 are connected by a bus 19.

The CPU 13 controls the overall information processing apparatus 1. The ROM 14 stores various programs including an information processing program and various types of data for use in each exemplary embodiment. The RAM 15 is a memory to be used as a working area during execution of various programs. The CPU 13 loads a program stored in the ROM 14 on the RAM 15 and executes the program to verify the person 2 and the object 3. Examples of the storage 16 include a hard disk drive (HDD), a solid state drive (SSD), and a flash memory. The storage 16 may store the information processing program. The communication I/F 17 transmits and receives data. The loudspeaker 18 outputs sound.

The object 3 includes an antenna 31 and an IC chip 32. In response to a radio wave received from the near field communicator 12, the antenna 31 receives information from or transmits information to the near field communicator 12. The IC chip 32 stores the personal information of the person 2.

Figure 3:
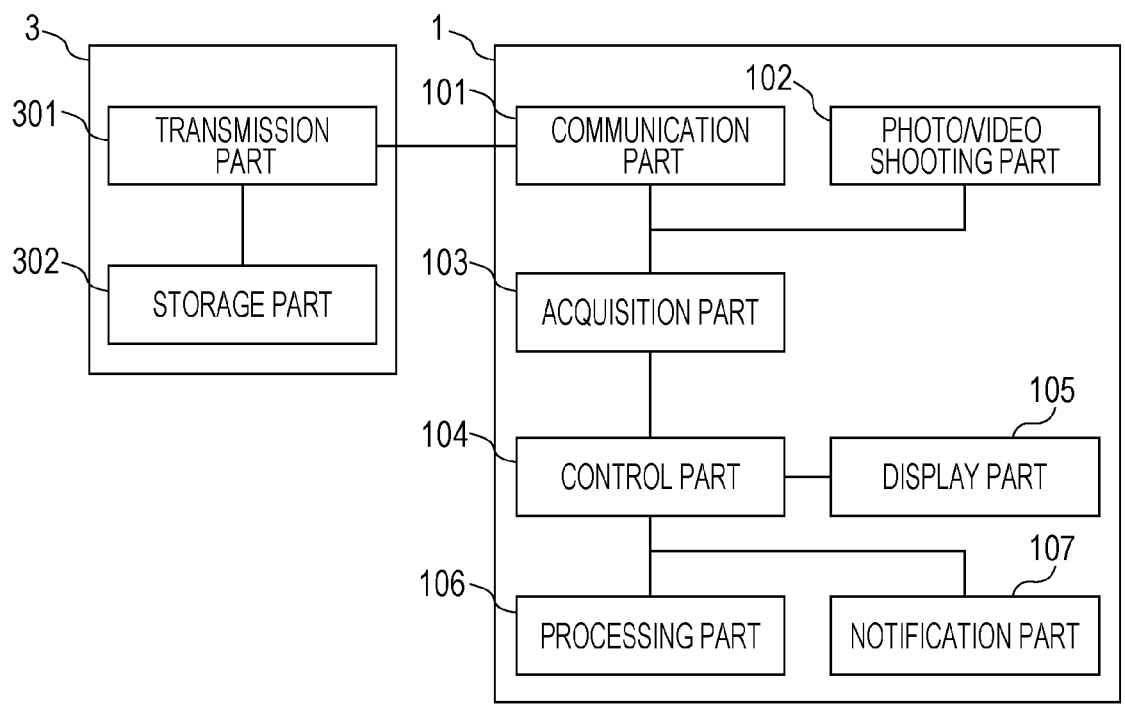
FIG. 3 is a block diagram illustrating an example of the functional configuration of the information processing apparatus according to a first exemplary embodiment.

Next, the functional configuration of the information processing apparatus 1 is described. FIG. 3 is a block diagram illustrating an example of the functional configuration of the information processing apparatus according to a first exemplary embodiment.

As illustrated in FIG. 3, the information processing apparatus 1 includes a communication part 101, a photo/video shooting part 102, an acquisition part 103, a control part 104, a display part 105, a processing part 106, and a notification part 107. The CPU 13 executes the information processing program and controls the hardware to function as the communication part 101, the photo/video shooting part 102, the acquisition part 103, the control part 104, the display part 105, the processing part 106, and the notification part 107.

The communication part 101 performs near field communication with the IC chip 32 on the object. The communication part 101 is typically a reader that can read information from the IC chip 32 by near field communication. Specifically, the communication part 101 performs near field communication with the object 3 to receive the personal information stored in the object 3 or the information necessary to access the personal information of the person 2 that is stored in the external database. The communication part 101 transmits data to and receives data from an external server or terminal. The photo/video shooting part 102 corresponds to the camera 10 in FIG. 2.

The acquisition part 103 acquires personal information for use in individual identification from the IC chip 32 on the object 3. Specifically, the acquisition part 103 acquires personal information from the object 3 via the communication part 101. The acquisition part 103 acquires image data from the photo/video shooting part 102. Image data is typically a photo or a video but they are not necessarily present as a file or saved for later viewing.

The control part 104 analyzes the image data acquired from the photo/video shooting part 102 by the acquisition part 103. If the image data contains both the person 2 and the object 3 with the IC chip 32, the control part 104 permits a process using the personal information acquired from the IC chip 32 after the image data is acquired. If the image data does not contain at least one of the person 2 or the object 3 with the IC chip 32, the control part 104 forbids the process using the acquired personal information.

The display part 105 displays, on a screen, what is present in the shooting area of the photo/video shooting part 102. The display part 105 displays, on the screen, predetermined frames to guide positions of shooting targets.

The processing part 106 performs the process using the personal information if the control part 104 recognizes the person 2 and the object 3. The notification part 107 provides at least one of an audio guide, an image guide, or a text guide.

The object 3 includes a transmission part 301 and a storage part 302. The transmission part 301 receives radio waves from the near field communicator 12 and transmits the personal information stored in the storage part 302 to the communication part 101. The storage part 302 stores the personal information.

Figure 4:
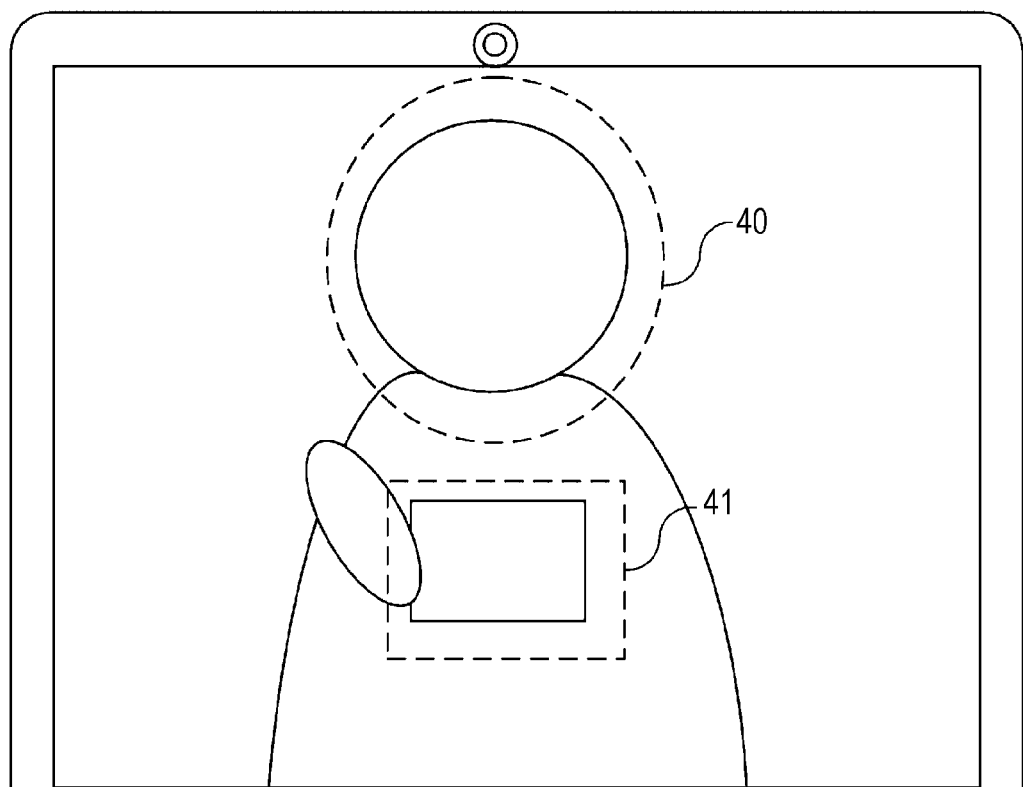
FIG. 4 is a schematic diagram illustrating an example of a process for shooting a person and an object by using a photo/video shooting part according to the first exemplary embodiment.

Next, a method for verification of the person 2 in the information processing apparatus 1 is described with reference to FIG. 4 prior to description of operations of the information processing apparatus 1. FIG. 4 is a schematic diagram illustrating an example of a process for verification of the person 2 by shooting of a photo and a video of the person 2 and the object 3 according to the first exemplary embodiment. The process takes place at the information processing apparatus 1. Below, the video is used as an example of image data coming from the photo/video shooting part 102.

The object 3 has at least one of a character string, an image of the person 2, or a shape. The personal information contains at least one of information on a preregistered character string, information on a preregistered image of the person, or information on a preregistered shape. As a verification method, the control part 104 verifies whether at least one of the information on the character string, the information on the image of the person, or the information on the shape contained in the personal information corresponds to at least one of information on the character string, information on the image of the person 2, or information on the shape obtained by analyzing the image data from the photo/video shooting part 102. The correspondence means that the information contained in the personal information and the information obtained by analyzing the image data from the photo/video shooting part 102 are presumably identical to each other. In terms of matching, the present disclosure does not require an exact sameness. It is determined that the information contained in the personal information corresponds to the information obtained by analyzing the image data from the photo/video shooting part 102 if there is a match to the extent that they are presumably identical to each other. Examples of a method for analyzing the image data from the photo/video shooting part 102 include a method that involves extracting, as feature points, features such as eyes, a nose, a mouth, a profile, and a color of the person 2 and the object 3 in the image data. That is, the image data acquired from the photo/video shooting part 102 may be compared against the preregistered image data (e.g., photo, video) by, for example, comparing feature points extracted from the acquired image data and feature points in the preregistered image data.

In this exemplary embodiment, examples of the object 3 include an ID card (for example, a driver's license) of the person 2 with an image of the person 2, and a character string showing his/her name and address. The object 3 (ID card in this case) has the IC chip 32 which stores personal information indicating the image of the person 2 and the character string showing his/her name and address. The object 3 and the IC chip 32 are not limited thereto. The object 3 may have any color, pattern, or shape.

The display part 105 of the information processing apparatus 1 displays what is present in the shooting area of the photo/video shooting part 102, and overlays a predetermined frame 40 to guide the position of the person 2, and a predetermined frame 41 to guide the position of the object 3.

To help the person 2 to shoot a photo or a video of the person 2 and the object 3, the control part 104 causes the notification part 107 to provide a prompt to adjust the position of the person 2 as guided by the frame 40 and the position of the object 3 as guided by the frame 41. The frames 40 and 41 may be displayed at the same time, so that both the person 2 and the object 3 can be in a photo shot or a video frame.

The control part 104 acquires image data (e.g., photo, video) from the photo/video shooting part 102. The control part 104 analyzes the image data and determines whether the person 2 and the object 3 are present in the image data based, for example, on whether the person 2 fits in the predetermined frame 40 and the object 3 fits in the predetermined frame 41.

If the person 2 and the object 3 have been recognized in the image data, the control part 104 acquires the personal information and performs a process using the personal information. If the person 2 or the object 3 has not been recognized because the person 2 does not fit in the predetermined frame 40 or the object 3 does not fit in the predetermined frame 41, the control part 104 instructs the person 2 to shoot a better photo or video so that the person 2 and the object 3 can be recognized in the photo or video.

Specifically, if the person 2 and the object 3 have been recognized, the control part 104 acquires the personal information from the IC chip 32 on the object 3 and the communication part 101 transmits the personal information acquired from the IC chip 32 and the image data acquired from the photo/video shooting part 102 to a terminal or server installed at a distance. If at least one of the person 2 or the object 3 has not been recognized, the person 2 is instructed to shoot a better photo or video, so that both the person 2 and the object 3 can be recognized from the photo or video.

In this exemplary embodiment, the person 2 is instructed to shoot a better photo or video to include both the person 2 and the object 3 if at least one of the person 2 or the object 3 has not been recognized, but the person 2 may be instructed to shoot a photo or video to include what was not recognized in the previous photo or video acquired from the photo/video shooting part 102. For example, if the person 2 and the object 3 are present in the previous photo or video but the control part 104 recognizes the object 3 does not fit in the predetermined frame 41, the person 2 may be instructed to reshoot a photo or video of the object 3. The control part 104 compares the object 3 in the new photo or video against the object 3 in the previous photo or video, and if they match, transmits a photo shot or a video frame that contains the person 2 and a photo shot or a video frame that contains the object 3.

It may also be possible to configure the control part 104 to forbid the process using the personal information if at least one of the person 2 or the object 3 has not been recognized. For example, if at least one of the person 2 or the object 3 has not been recognized, the control part 104 may store the image data in the storage of the information processing apparatus 1 or transmit the image data to a server or the like installed at a different place.

Figure 5:
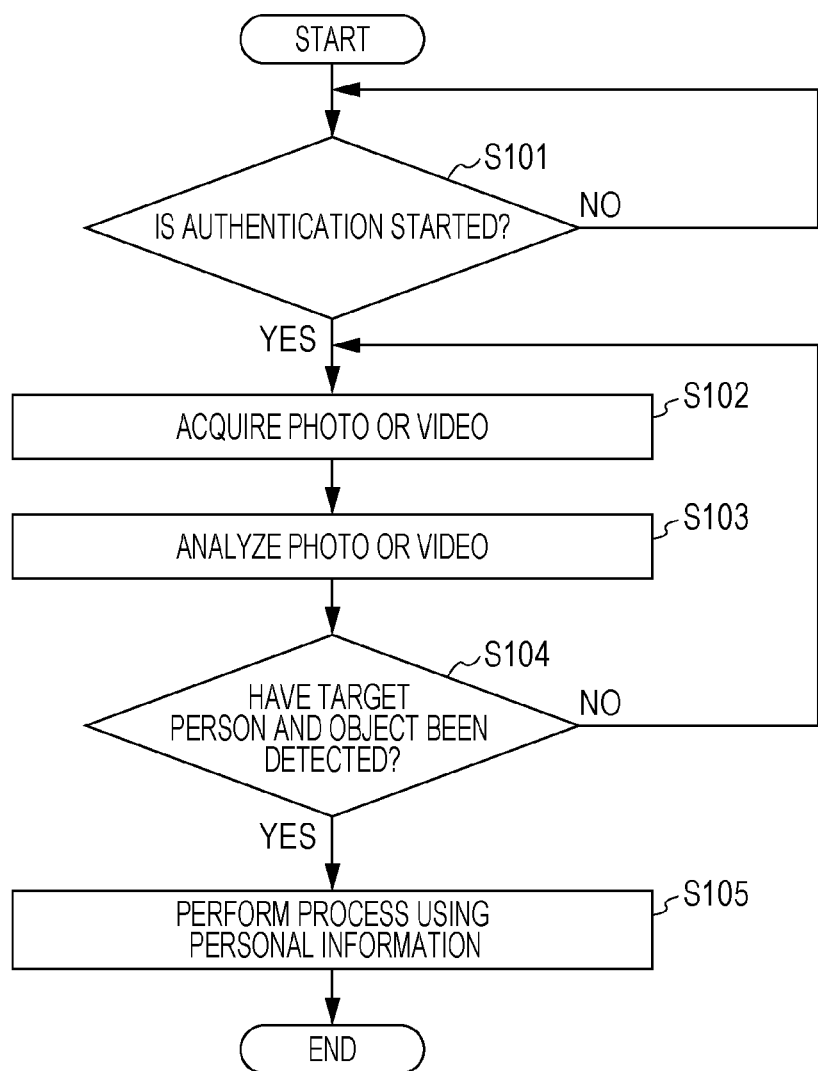
FIG. 5 is a flowchart illustrating an example of an authentication process according to the first exemplary embodiment.

Next, operations of the information processing program according to this exemplary embodiment are described with reference to FIG. 5. FIG. 5 is a flowchart illustrating an example of an authentication process according to the first exemplary embodiment. The CPU 13 reads the information processing program from the ROM 14 or the storage 16 and executes the information processing program to execute the authentication process illustrated in FIG. 5. For example, the authentication process illustrated in FIG. 5 is executed when a user starts the information processing apparatus 1 and inputs an instruction to execute the information processing program.

In Step S101, the CPU 13 determines whether authentication is started. If authentication is started (Step S101: YES), the CPU 13 proceeds to Step S102. If authentication is not started (Step S101: NO), the CPU 13 waits for the start of authentication.

In Step S102, the CPU 13 acquires a photo or video from the photo/video shooting part 102.

In Step S103, the CPU 13 analyzes the photo or video to detect the person 2 and the object 3.

In Step S104, the CPU 13 determines whether the person 2 and the object 3 are detected in the predetermined frames. If the person 2 and the object 3 are detected (Step S104: YES), the CPU 13 proceeds to Step S105. If at least one of the person 2 or the object 3 is not detected (Step S104: NO), the CPU 13 proceeds to Step S102.

In Step S105, the CPU 13 acquires the personal information from the IC chip 32 and performs a process using the personal information.

Second Exemplary Embodiment

In the first exemplary embodiment, the process using the personal information is performed if the person 2 and the object 3 have been recognized in the image data from the photo/video shooting part 102. In this second exemplary embodiment, the process using the personal information is performed if the person 2 is detected to perform a predetermined action in image data from the photo/video shooting part 102. The structure of the information processing apparatus 1 according to this exemplary embodiment (see FIG. 1) and the hardware configuration of the information processing apparatus 1 (see FIG. 2) are similar to those in the first exemplary embodiment and description thereof is omitted.

Figure 6:
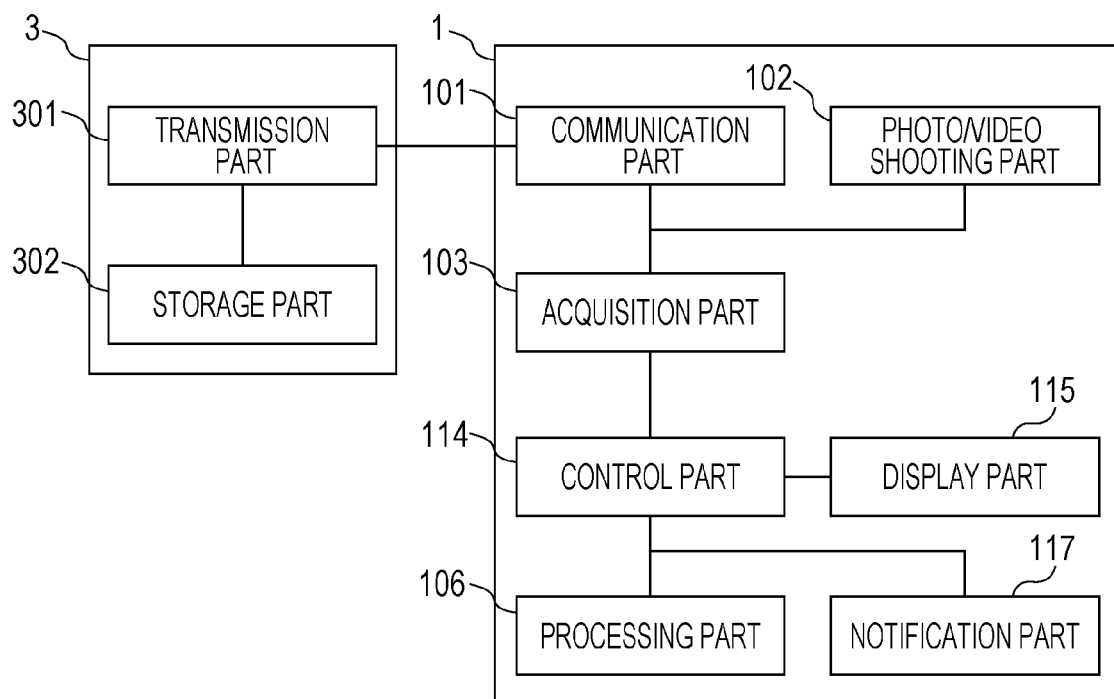
FIG. 6 is a block diagram illustrating an example of the functional configuration of an information processing apparatus according to a second exemplary embodiment.

The functional configuration of the information processing apparatus 1 is described with reference to FIG. 6. FIG. 6 is a block diagram illustrating an example of the functional configuration of the information processing apparatus 1 according to the second exemplary embodiment. In FIG. 6, the same functional components as those of the information processing apparatus 1 illustrated in FIG. 3 are represented by the same reference symbols as those in FIG. 3 and description thereof is omitted.

A control part 114 analyzes image data acquired by the acquisition part and checks whether the image data contains both the person 2 and the object 3 with the IC chip 32. If the image data does not contain at least one of the person 2 or the object 3 with the IC chip 32, the control part 114 forbids a process using the personal information acquired from the IC chip 32. If determination is made, as a result of the image data analysis, that the person 2 holds the object 3 and performs a predetermined action, the control part 114 performs the process using the personal information. The predetermined action according to this exemplary embodiment refers to such an action that the person 2 brings the object 3 closer to the communication part 101 for near field communication.

A display part 115 displays, on a screen, a real-time feedback of what is in the shooting area of the photo/video shooting part 102 while image data is being received from the photo/video shooting part 102. The display part 115 overlays, on the screen, predetermined frames to guide the positions of the person 2 and the object 3 at a moment, and overlays just a predetermined frame to guide the position of the object 3 at another moment.

A notification part 117 provides at least one of an audio guide, an image guide, or a text guide. If at least one of the person 2 or the object 3 is not positioned as guided by the predetermined frame on the screen of the display part 115, the notification part 117 provides a prompt to adjust the position of the person 2 or the object 3 as guided by the predetermined frame. If more than one person 2 or more than one object 3 is detected in the predetermined frame on the screen of the display part 115, the notification part 117 provides a prompt to place only one person 2 or only one object 3 in the predetermined frame.

The control part 114 causes the notification part 117 to provide the person 2 with a prompt to shoot a photo or video of the person 2 and the object 3. The control part 114 causes the notification part 117 to prompt the person 2 to change the position of the object 3 so as to change the distance between the person 2 and the object 3. If the person 2 and the object 3 cannot be extracted from the photo or video, the control part 114 causes the notification part 117 to give a notification that the person 2 and the object 3 cannot be extracted from the photo or video.

Figure 7:
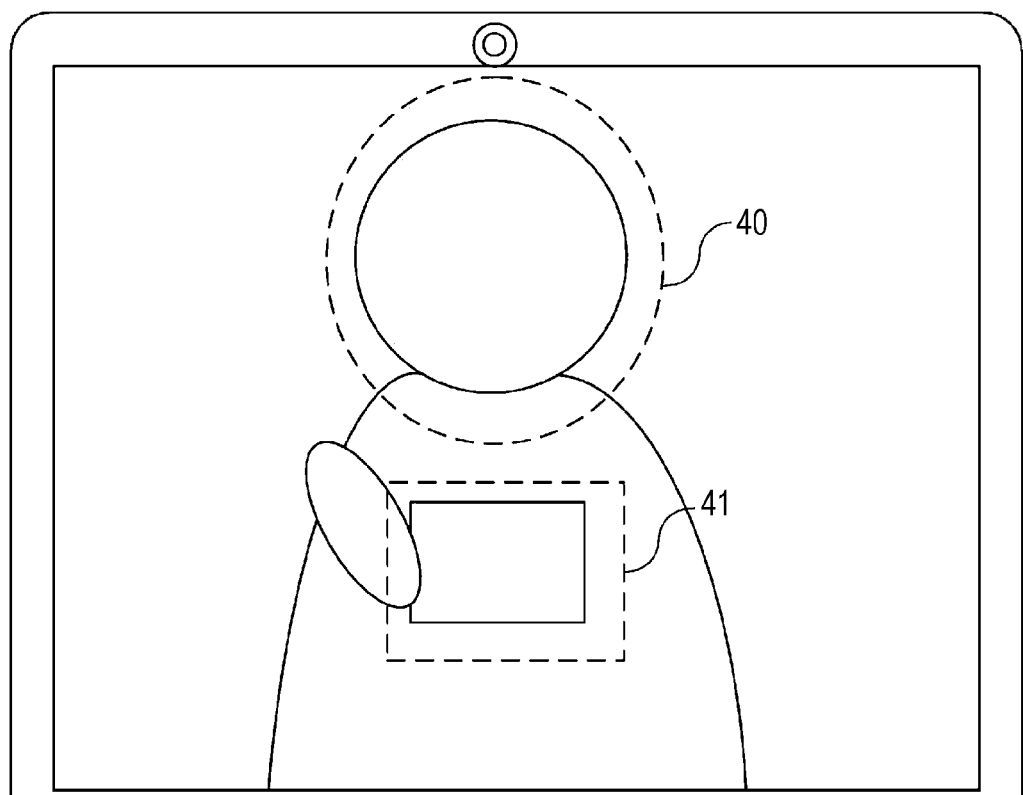
FIG. 7 is a schematic diagram illustrating an example of a process for shooting a person and an object by using the photo/video shooting part according to the second exemplary embodiment.

Next, a method for verifying the person 2 in the information processing apparatus 1 is described with reference to FIGS. 7, 8, and 9 prior to description of operations of the information processing apparatus 1. First, a method for instructing the user to shoot a photo or video of the person 2 and the object 3 for verification is described with reference to FIG. 7. FIG. 7 is a schematic diagram illustrating an example of a process for shooting the person 2 and the object 3 by using the photo/video shooting part 102 according to the second exemplary embodiment.

As illustrated in FIG. 7, to guide the person 2 to shoot a photo or a video of the person 2 and the object 3, the control part 114 causes the notification part 117 to provide the person 2 with a prompt to place the person 2 so as to fit in the frame 40 and to place the object 3 so as to fit in the frame 41 displayed on the screen. If the user is not successful in shooting a photo or video that includes the person 2 and the object 3, the control part 114 causes the notification part 117 to give a notification that the user is not successful.

Specifically, if at least one of the person 2 or the object 3 is not positioned as guided by the frame 40 or 41, the control part 114 causes the notification part 117 to provide the person 2 with a prompt to adjust the position of the person 2 as guided by the frame 40 or the position of the object 3 as guided by the frame 41. If more than one person 2 is detected in the frame 40 or if more than one object 3 is detected in the frame 41, the control part 114 causes the notification part 117 to provide a prompt to place only one person 2 or only one object 3 in the frame 40 or 41. If the person 2 does not fit in the frame 40 or if the object 3 does not fit in the frame 41, the control part 114 causes the notification part 117 to provide a prompt to fit the person 2 in the frame 40 or the object 3 in the frame 41.

If the person 2 is successful in shooting a photo or a video that includes the person 2 and the object 3, the control part 114 causes the notification part 117 to provide the person 2 with a prompt to bring the object 3 closer to the information processing apparatus 1.

Next, shooting of the object 3 brought closer to the information processing apparatus 1 is described with reference to FIG. 8. FIG. 8 is a schematic diagram illustrating an example of a shooting process of the object 3 in the information processing apparatus according to the second exemplary embodiment.

Figure 8:
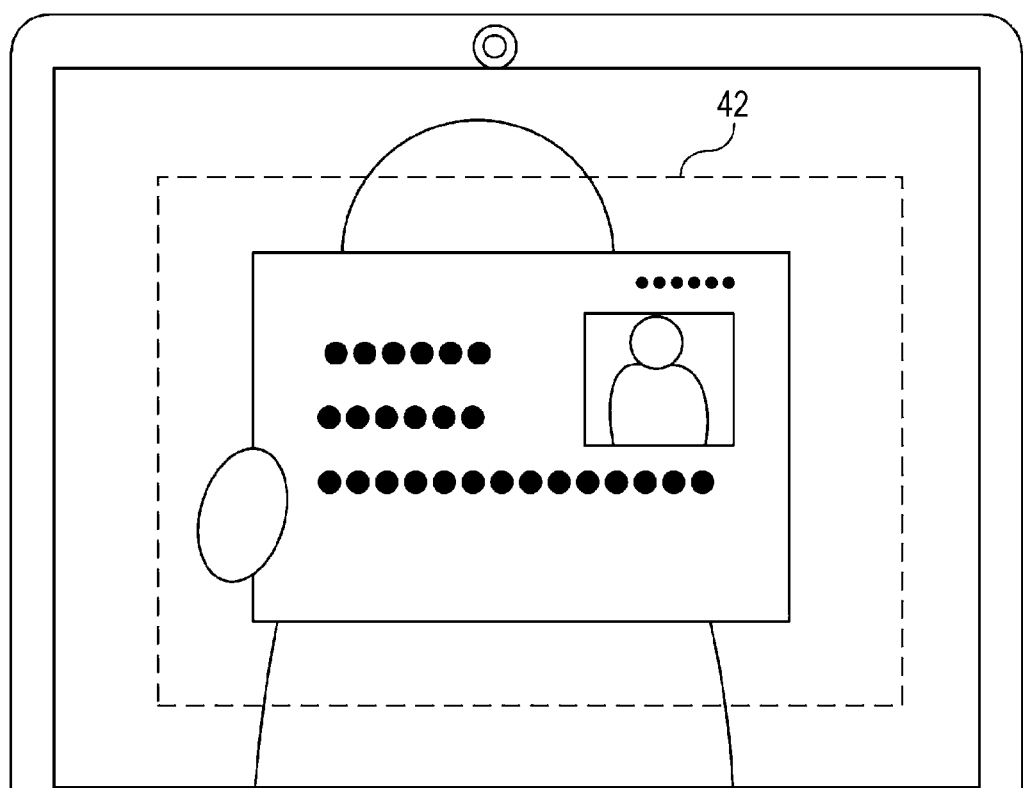
FIG. 8 is a schematic diagram illustrating an example of a process for shooting the object by using the photo/video shooting part according to the second exemplary embodiment.

As illustrated in FIG. 8, the display part 115 of the information processing apparatus 1 displays what is present in the shooting area of the photo/video shooting part 102 (the person 2 and the object 3 in this figure) and also displays a predetermined frame 42 to guide the position of the object 3.

To shoot the object 3 up close to include details that are visibly present on the object 3, the control part 114 causes the notification part 117 to provide the person 2 with a prompt to adjust the position of the object 3 as guided by the frame 42. If the close-up shooting of the object 3 is not successful, the control part 114 causes the notification part 117 to give the person 2 a notification that the close-up shooting of the object 3 is not successful.

Specifically, if the object 3 is not positioned as guided by the frame 42, the control part 114 causes the notification part 117 to provide the person 2 with a prompt to adjust the position of the object 3 as guided by the frame 42. If more than one object 3 is detected in the frame 42, the control part 114 causes the notification part 117 to provide the person 2 with a prompt to place only one object 3 in the frame 42. If the object 3 does not fit in the frame 42, the control part 114 causes the notification part 117 to provide the person 2 with a prompt to fit the object 3 in the frame 42. Here, the word "close-up shooting" is not intended to limiting to shooting a photo or video that only includes the object 3.

If the close-up shooting of the object 3 is successful, the control part 114 analyzes a photo shot or a video frame that contains the person 2 and the object 3 and a photo shot or a video frame that contains the object 3. If the image analysis shows that the distance between the person 2 and the object 3 has changed, the control part 114 causes the notification part 117 to provide the person 2 with a prompt to bring the object 3 further closer to the near field communicator 12. If the shooting of details of the appearance of the object 3 is not successful, the control part 114 causes the notification part 117 to notify the person 2 that the shooting of details of the appearance of the object 3 is not successful.

Figure 9:
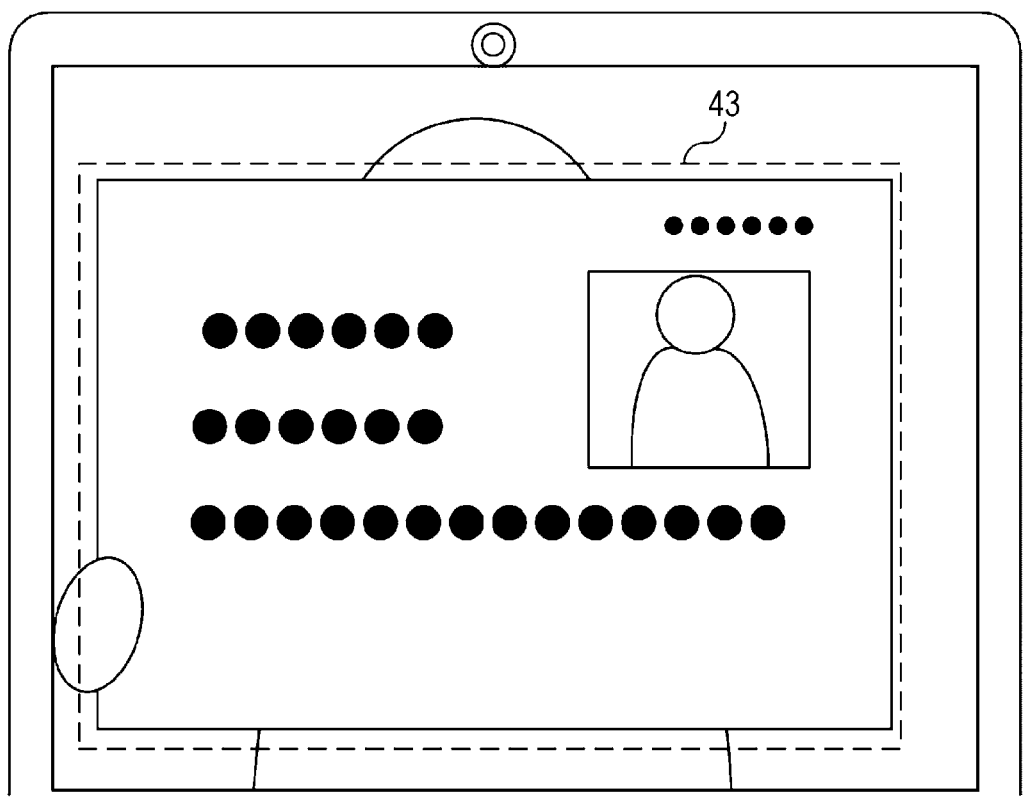
FIG. 9 is a schematic diagram illustrating an example of a process for shooting the object being brought closer to the near field communicator according to the second exemplary embodiment.

Next, with reference to FIG. 9, shooting of the object 3 being brought even closer to the near field communicator 12 than it was in FIG. 8 is described. FIG. 9 is a schematic diagram illustrating an example of a process for shooting the object 3 being brought closer to the near field communicator 12 according to the second exemplary embodiment.

As illustrated in FIG. 9, the display part 115 of the information processing apparatus 1 displays what is present in the shooting area of the photo/video shooting part 102 (the person 2 and the object 3 in this figure), and displays a predetermined frame 43 to guide the position of the object 3. To shoot the object 3 being brought closer to the near field communicator 12, the display part 115 displays the predetermined frame 43 to guide the position of the object 3 by enlarging the predetermined frame 42.

If the shooting of the object 3 being brought closer to the near field communicator 12 is successful, the control part 114 compares the object 3 in photo shots or video frames at different moments (e.g., FIG. 8 and FIG. 9). If the control part 114 determines that the object 3 has been brought closer, for example, because the size of the object 3 has increased from FIG. 8 to FIG. 9, the acquisition part 103 acquires the personal information from the object 3. If the control part 114 does not determine that the object 3 has not been recognized to have been brought closer, the control part 114 determines whether a predetermined period has elapsed. If the predetermined period has not elapsed, the control part 114 instructs the person 2 to bring the object 3 closer. If the predetermined period has elapsed, the control part 114 instructs the person 2 to place the object 3 and him/herself together as shown in FIG. 7 again, and then to move the object 3 closer to the near field communicator 12.

In this exemplary embodiment, the action of bringing the object 3 closer to the near field communicator 12 is used as an example of the predetermined action. However, the predetermined action is not limited thereto. An action of raising the hand of the person 2, an action of turning the body of the person 2 to look backward, and an action of bringing the object 3 away from the near field communicator 12 are also examples of the predetermined action.

In this exemplary embodiment, determination is made that the object 3 is brought closer if the size of the object 3 in photo shots or video frames at different moments increases. This is just an example and the determination can be made in other ways too. The information processing apparatus 1 may further include or be connected to a photo/video shooting part 102 that shoots the person 2 from the side and recognizes the person 2 bringing the object 3 closer to the near field communicator 12 based on image data from the another photo/video shooting part 102. The information processing apparatus 1 may further include a photo/video shooting part 102 that shoots the person 2 from the side and measures the distance between the person 2 and the object 3 or the distance between the information processing apparatus 1 and the object 3 to recognize the person 2 bringing the object 3 closer to the near field communicator 12.

The predetermined period according to this exemplary embodiment is the time from the prompt to bring the object 3 closer to the near field communicator 12 to the moment when the size of the object 3 becomes larger than a predetermined size in a photo shot or a video frame. The predetermined period is not limited thereto. The predetermined period may be a period that has elapsed from the prompt to bring the object 3 closer to the near field communicator 12.

If the object 3 is recognized to have been brought closer, the acquisition part 103 acquires the personal information from the IC chip on the object 3 and the control part 114 verifies the person 2 and the object 3 in image data from the photo/video shooting part 102 against the personal information acquired from the IC chip on the object 3 to authenticate the person 2. More specifically, the control part 114 may verify the person 2 and the object 3 as captured by photo shots or video frames against the personal information acquired from the IC chip on the object 3 to authenticate the person 2.

As a verification method, the control part 114 analyzes the object 3 as captured by the image data and extracts information about the person 2 from the object 3 as captured by the image data. Examples of the information about the person 2 extracted from the object 3 as captured by the image data include a photo, name, and address of the person 2 that are visibly present on the object 3. The control part 114 compares the information about the person 2 that has been extracted from the object 3 as captured by the image data against the personal information acquired from the IC chip 32 on the object 3. More specifically, the object 3 as captured by a photo shot or a video frame in FIG. 8 or FIG. 9 may be analyzed to extract the information about the person 2 and may be compared against the personal information acquired from the IC chip 32 on the object 3.

The control part 114 analyzes the person 2 as captured by the image data and compares the person 2 as captured by the image data against the photo of the person extracted from the object 3 as captured by the image data. More specifically, the person 2 as captured by a photo shot or a video frame in FIG. 7 may be analyzed and be compared against the photo of the person 2 extracted from the object 3 as captured by the image data.

If these comparisons find matches, the control part 114 authenticates the person 2.

In this exemplary embodiment, a photo shot or video frame that contains the person 2 and the object 3, a photo shot or video frame that contains the object 3, and the personal information are acquired in this order. The order of acquisition is not limited thereto and may be changed. For example, the personal information may be acquired first and then a photo shot or video frame that contains the object 3 and a photo shot or video frame that contains the person 2 and the object 3 may be acquired.

Figure 10:
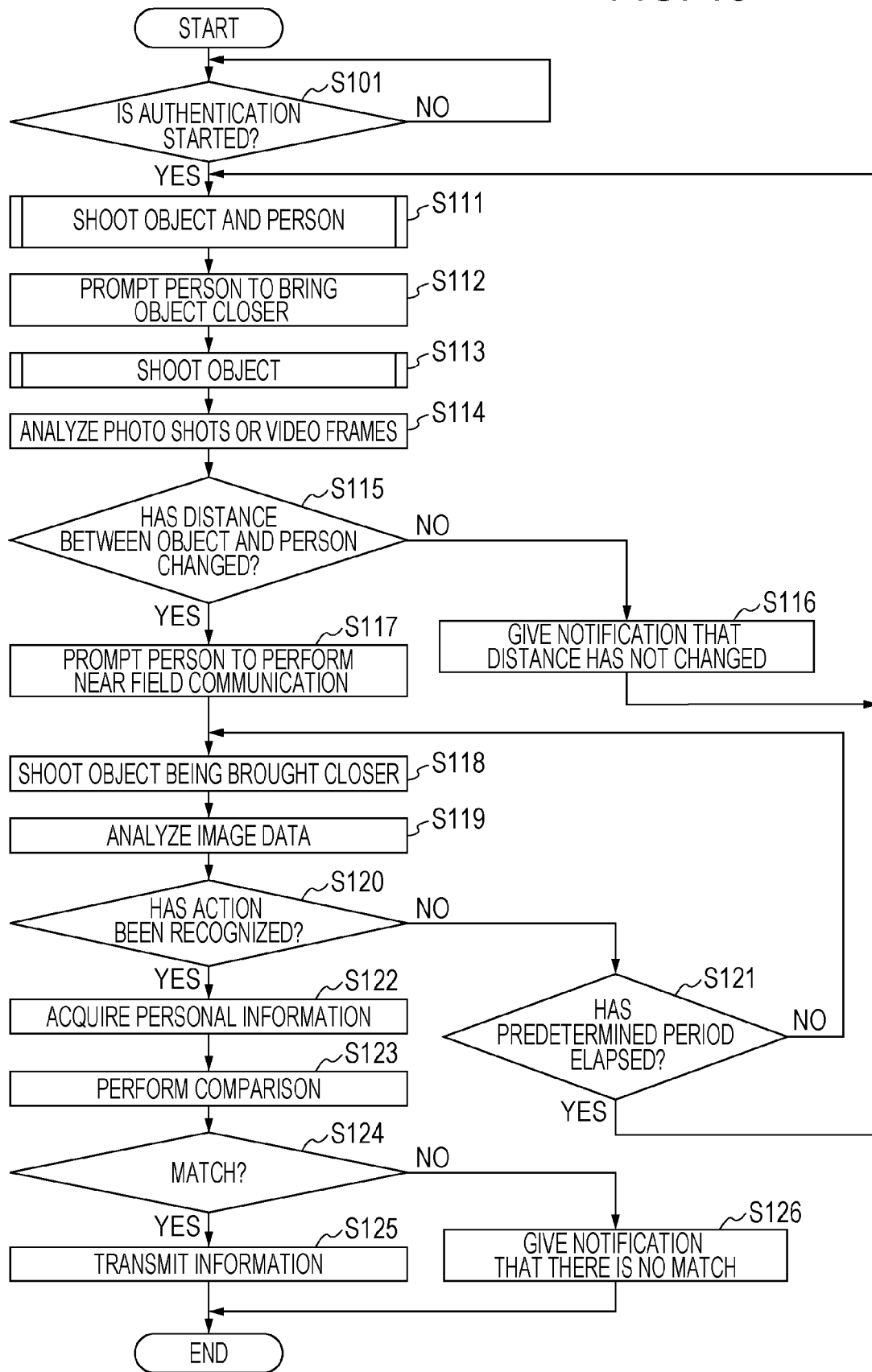
FIG. 10 is a flowchart illustrating an example of an authentication process according to the second exemplary embodiment.
Figure 11:
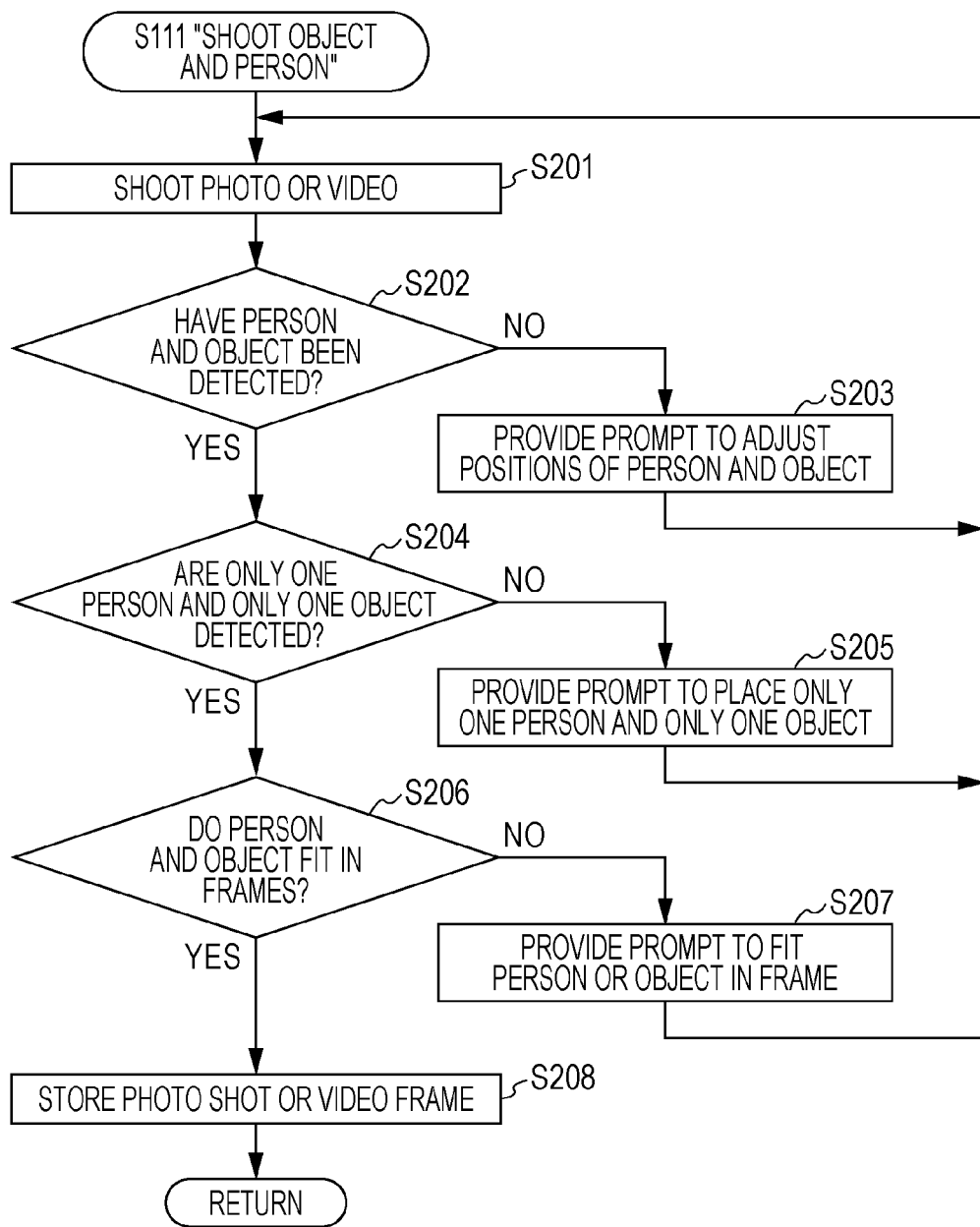
FIG. 11 is a flowchart illustrating an example of the process for shooting the person by using the photo/video shooting part according to the second exemplary embodiment.
Figure 12:
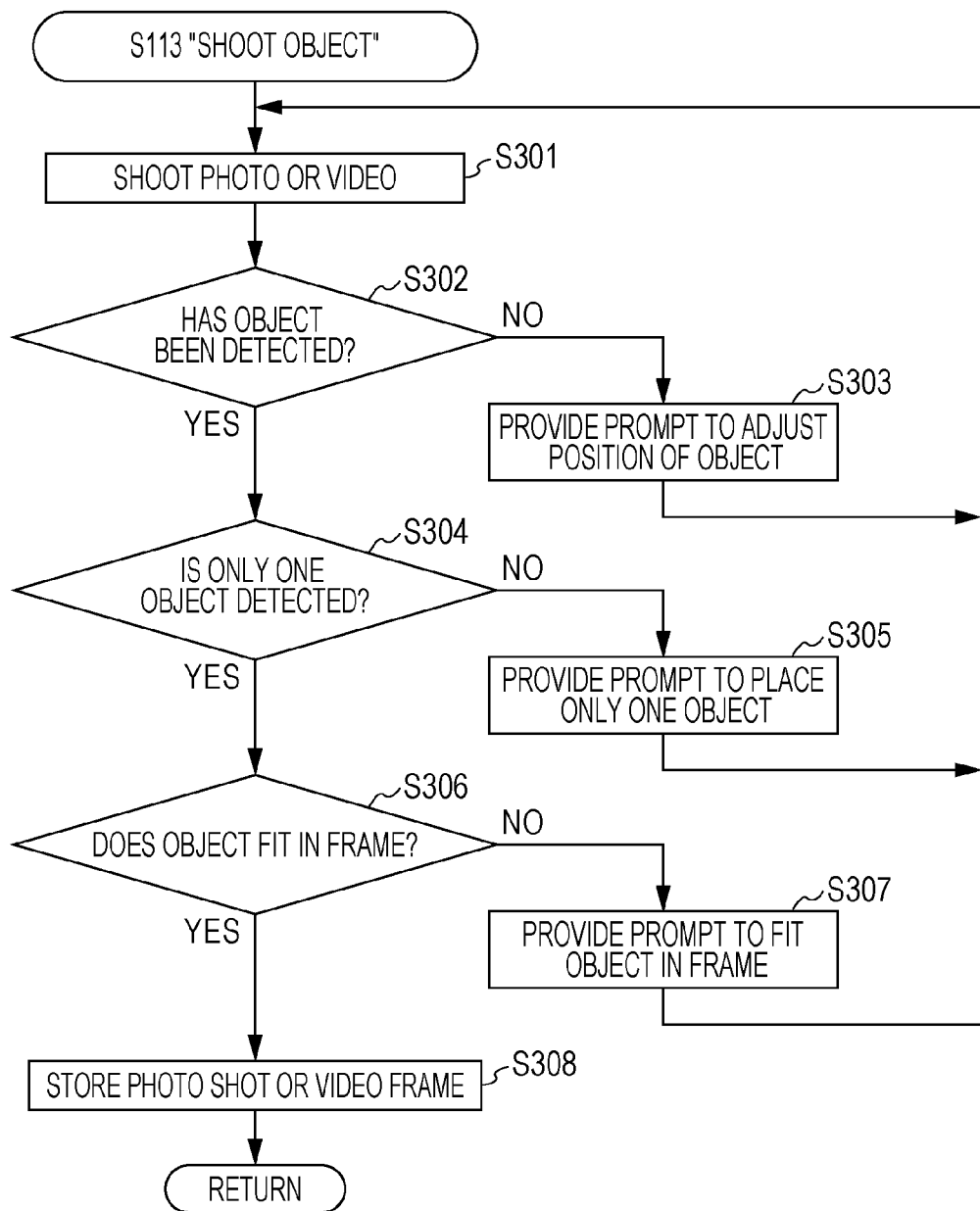
FIG. 12 is a flowchart illustrating an example of the process for shooting the object by using the photo/video shooting part according to the second exemplary embodiment.

Next, operations of the information processing program according to this exemplary embodiment are described with reference to FIGS. 10, 11, and 12. FIG. 10 is a flowchart illustrating an example of an authentication process according to the second exemplary embodiment. The CPU 13 reads the information processing program from the ROM 14 or the storage 16 and executes the information processing program to execute the authentication process illustrated in FIG. 10. For example, the authentication process illustrated in FIG. 10 is executed when the user starts the information processing apparatus 1 and inputs an instruction to execute the information processing program.

In Step S111, the CPU 13 shoots the person 2 and the object 3 by using the photo/video shooting part 102.

In Step S112, the CPU 13 causes the notification part 117 to prompt the person 2 to bring the object closer.

In Step S113, the CPU 13 shoots the object 3 by using the photo/video shooting part 102.

In Step S114, using image data received from the photo/video shooting part 102, the CPU 13 analyzes a photo shot or a video frame that contains the person 2 and the object 3 and also analyzes a photo shot or a video frame that contains the object 3 to recognize a positional relationship between the person 2 and the object 3 and details of the appearance of the object 3.

In Step S115, the CPU 13 determines whether the distance between the person 2 and the object 3 has changed. If the distance has changed (Step S115: YES), the CPU 13 proceeds to Step S117. If the distance has not changed (Step S115: NO), the CPU 13 proceeds to Step S116.

In Step S116, the CPU 13 causes the notification part 117 to give a notification to the person 2 that the distance between the person 2 and the object 3 has not changed.

In Step S117, the CPU 13 causes the notification part 117 to provide the person 2 with a prompt to bring the object 3 closer to the near field communicator 12.

In Step S118, the CPU 13 causes the notification part 117 to guide the person 2 to shoot, by the photo/video shooting part 102, the object 3 being brought closer to the near field communicator 12.

In Step S119, the CPU 13 analyzes image data received from the photo/video shooting part 102 to recognize the person 2 performing a predetermined action. The predetermined action may, for example, be bringing the object 3 closer to the near field communicator 12.

In Step S120, the CPU 13 determines whether the predetermined action by the person 2 has been recognized. If the predetermined action by the person 2 has been recognized (Step S120: YES), the CPU 13 proceeds to Step S122. If the predetermined action by the person 2 has not been recognized (Step S120: NO), the CPU 13 proceeds to Step S121.

In Step S121, the CPU 13 determines whether the predetermined period has elapsed. If the predetermined period has elapsed (Step S121: YES), the CPU 13 proceeds to Step S111. If the predetermined period has not elapsed (Step S121: NO), the CPU 13 proceeds to Step S118.

In Step S122, the CPU 13 performs near field communication with the object 3 to acquire personal information from the IC chip 32 on the object 3.

In Step S123, the CPU 13 compares the personal information against results of analysis of image data of the person 2 and the object 3 received from the photo/video shooting part 102.

In Step S124, the CPU 13 determines whether there is a match as a result of the comparison. If there is a match as a result of the comparison (Step S124: YES), the CPU 13 proceeds to Step S125. If there is no match as a result of the comparison (Step S124: NO), the CPU 13 proceeds to Step S126.

In Step S125, the CPU 13 transmits a photo shot or a video frame that contains the person 2 and the object 3, a photo shot or a video frame that contains the object 3, and the personal information to a server.

In Step S126, the CPU 13 causes the notification part 117 to give the person 2 a notification that there is no match as a result of the comparison.

Next, the process for shooting a photo/video of the person and the object according to an exemplary embodiment is described with reference to FIG. 11. FIG. 11 is a flowchart illustrating an exemplary process for shooting the person and the object using the photo/video shooting part 102 according to the second exemplary embodiment. The CPU 13 reads a program from the ROM 14 or the storage 16 and executes the program to execute the process for shooting the person illustrated in FIG. 11. For example, the process illustrated in FIG. 11 is executed when the information processing program gives an instruction to execute the process for shooting a photo or a video of the person.

In Step S201, the CPU 13 shoots, by using the photo/video shooting part 102, a photo or a video.

In Step S202, the CPU 13 analyzes the image data (the photo or video) received from the photo/video shooting part 102 and determines whether the person 2 and the object 3 are detected in the image data. More specifically, the CPU 13 determines whether the person 2 and the object 3 are detected in predetermined frames. If the person 2 and the object 3 are detected (Step S202: YES), the CPU 13 proceeds to Step S204. If no person 2 or no object 3 is detected (Step S202: NO), the CPU 13 proceeds to Step S203.

In Step S203, the CPU 13 causes the notification part 117 to give the person 2 a notification that no person 2 or no object 3 is detected in the predetermined frame.

In Step S204, the CPU 13 determines whether only one person 2 and only one object 3 are detected in the predetermined frames. If only one person 2 and only one object 3 are detected (Step S204: YES), the CPU 13 proceeds to Step S206. If only one person 2 or only one object 3 is not detected (Step S204: NO), the CPU 13 proceeds to Step S205.

In Step S205, the CPU 13 causes the notification part 117 to provide the person 2 with a prompt to place only one person 2 or only one object 3.

In Step S206, the CPU 13 determines whether the person 2 and the object 3 fit in the predetermined frames. If the person 2 and the object 3 fit in the predetermined frames (Step S206: YES), the CPU 13 proceeds to Step S208. If the person 2 or the object 3 does not fit in the predetermined frame (Step S206: NO), the CPU 13 proceeds to Step S207.

In Step S207, the CPU 13 causes the notification part 117 to provide the person 2 with a prompt to fit the person 2 or the object 3 in the predetermined frame.

In Step S208, the CPU 13 stores a photo shot or a video frame that contains the person 2 and the object 3 in the RAM 15 and terminates the shooting process. The CPU 13 may store an entire video which comprises the video frame that contains the person 2 and the object 3.

Next, the process for shooting the object by using the photo/video shooting part 102 according to an exemplary embodiment is described with reference to FIG. 12. FIG. 12 is a flowchart illustrating an example of the process for shooting the object according to the second exemplary embodiment. The CPU 13 reads a program from the ROM 14 or the storage 16 and executes the program to execute the process for shooting the object illustrated in FIG. 12. For example, the process illustrated in FIG. 12 is executed when the information processing program gives an instruction to execute the process for shooting a photo or a video of the object.

In Step S301, the CPU 13 shoots, by using the photo/video shooting part 102, a photo or a video.

In Step S302, the CPU 13 analyzes the image data (the photo or video) received from the photo/video shooting part 102 and determines whether the object 3 is detected in a predetermined frame in the image data. If the object 3 is detected (Step S302: YES), the CPU 13 proceeds to Step S304. If no object 3 is detected (Step S302: NO), the CPU 13 proceeds to Step S303.

In Step S303, the CPU 13 causes the notification part 117 to provide the person 2 with a prompt to adjust the position of the object 3 as guided by the predetermined frame.

In Step S304, the CPU 13 determines whether only one object 3 is detected in the predetermined frame. If only one object 3 is detected (Step S304: YES), the CPU 13 proceeds to Step S306. If only one object 3 is not detected (Step S304: NO), the CPU 13 proceeds to Step S305.

In Step S305, the CPU 13 causes the notification part 117 to provide the person 2 with a prompt to place only one object 3.

In Step S306, the CPU 13 determines whether the object 3 fits in the predetermined frame. If the object 3 fits in the predetermined frame (Step S306: YES), the CPU 13 proceeds to Step S308. If the object 3 does not fit in the predetermined frame (Step S306: NO), the CPU 13 proceeds to Step S307.

In Step S307, the CPU 13 causes the notification part 117 to provide the person 2 with a prompt to fit the object 3 in the predetermined frame.

In Step S308, the CPU 13 stores a photo shot or a video frame that contains the object 3 in the RAM 15 and terminates the photo/video shooting process. The CPU 13 may store an entire video which comprises the video frame that contains the object 3.

In this exemplary embodiment, the predetermined process that is performed upon a match as a result of the comparison is transmission, to a server, of image data of the person 2 and the object 3 received from the photo/video shooting part 102 and the personal information of the person 2 acquired from the IC chip 32 on the object 3. The information processing apparatus 1 is not limited thereto. The information processing apparatus 1 may have or be accessible to a storage that stores personal information of the person 2, compare the acquired personal information against the stored personal information, and unlock a door or the like if there is a match as a result of the comparison.

In this exemplary embodiment, the personal information is stored in the IC chip 32 but may be stored in the storage 16 of the information processing apparatus 1. For example, the IC chip 32 may store information uniquely determined for each target person (hereinafter referred to as "target person key") and the information processing apparatus 1 may store the personal information and the target person key in association with each other. The information processing apparatus 1 may acquire the target person key from the IC chip 32 and identify and acquire the personal information by using the target person key.

The personal information may be stored in each of the IC chip 32 and the storage 16 of the information processing apparatus 1. For example, each of the IC chip 32 and the information processing apparatus 1 may store the personal information and the information processing apparatus 1 may compare the personal information acquired from the IC chip against the personal information stored in the information processing apparatus 1.

As described above, according to this exemplary embodiment, the person 2 is not verified if the predetermined action of the person 2 is not recognized when the photo shot or the video frame that contains the person 2 and the object 3, the photo shot or the video frame that contains the object 3, and the personal information are compared.

In this exemplary embodiment, the camera 10 may shoot a photo or video of the front of the person 2. The camera 10 is not limited thereto. Cameras 10 may be installed at a plurality of places and may shoot photos and videos of the front and sides of the person 2 to recognize a change in the positional relationship between the person 2 and the object 3 from image data from a side camera.

In this exemplary embodiment, after the predetermined action has been recognized, comparison is made by using the photo shot or video frame that contains the person 2 and the object 3, the photo shot or video frame that contains the object 3, and the personal information. If there is a match as a result of the comparison, the image data and the personal information are transmitted to a server. The information processing apparatus 1 is not limited thereto. The image data and the personal information may be transmitted to a server upon recognition of the predetermined action.

EXAMPLES

Next, examples of the exemplary embodiments of the present disclosure are described.

Example 1

First, description is made of an example of the exemplary embodiments of the present disclosure in which personal information is registered and personal identification is verified when, for example, a bank account is opened. In this example, the information processing apparatus 1 is a terminal such as a smartphone carried by a user.

After the user has filled in an input form, the terminal initiates a process for shooting a video to include a video frame that contains both the user and his/her driver's license (first data). The terminal displays a message "Please have your driver's license ready." on a screen. The terminal activates a camera function. The terminal displays, on a screen, a message "Please show yourself and your driver's license to the camera. You and your driver's license must fit in the frames displayed on the screen." and displays the frames and what is present in the shooting area of the camera. If the user and/or his/her driver's license are misplaced, the terminal displays, on the screen, a message "Please adjust positions of yourself and your driver's license to fit in the frames." If more than one user or more than one driver's license is detected, the terminal displays, on the screen, a message "Please fit only one user and only one driver's license in the frames".

When the user and his/her driver's license are present in a video frame of the video, the terminal continues to shoot the video to further include a video frame in which a close-up of the driver's license is present (second data). The terminal displays, on the screen, a message "Please bring your driver's license closer to the camera to fit in the frame displayed on the screen." and a frame that is bigger than the frame for the driver's license displayed at an earlier stage. If the driver's license does not fit in or is not detected in the frame in a video frame of the video, the terminal displays, on the screen, a message "Please fit your driver's license in the frame". If more than one driver's licenses are detected, the terminal displays, on the screen, a message "Please fit only one driver's license in the frame."

When the video includes a video frame with a close-up of the driver's license (second data), the terminal extracts and compares the user in the first data and the photo on the driver's license in the second data.

The terminal then displays a message "Please bring your driver's license closer to the near field communicator of the terminal." on the screen. The terminal performs near field communication with an IC chip on the driver's license via the near field communicator to acquire data about the user including the name, address, and facial image of the user stored in the IC chip (third data). The terminal extracts data about the user (e.g., name, address, and facial image) printed on the driver's license from the close up of the driver's license and compares the third data against the data about the user extracted from the close up.

If there is a match as a result of the comparison, the terminal displays a message "Personal identification is done." on the screen and transmits any information input on the form by the user, the first data, the second data, and the third data to a server that manages information of the user. If there is no match as a result of the comparison, the terminal displays a message "Personal identification has failed. Please photograph again." on the screen and keeps the camera function active for shooting another video.

Example 2

Next, description is made of an example of the exemplary embodiments of the present disclosure in which attendance of telecommuting is managed. In this example, the information processing apparatus 1 is a server that acquires personal information or the like from a terminal such as a smartphone carried by a user and gives notifications to the terminal.

In response to an execution instruction from the mobile terminal of the user, the server displays a message "Do you want to register the hours you worked?" on a screen of the mobile terminal. If the server has received a registration instruction from the user, the server activates a camera function of the mobile terminal and displays, on the screen of the mobile terminal, a message "Please adjust positions of yourself and your employee ID card to fit in the frames displayed on the screen." The mobile terminal sends a photo that includes the user and his/her employee ID card. The server analyzes the photo. If the ID photo of the person printed on the employee ID card matches the user as a result of the analysis, the server accepts registration of hours the user worked. If the user or his/her employee ID card has not been recognized in the received photo, the server displays a message "You or your employee ID card was not recognized. Registration process is terminated." on the screen of the mobile terminal and terminates the registration process without accepting registration of the hours the user worked.

Example 3

Next, description is made of an example of the exemplary embodiments of the present disclosure in which a door is unlocked (with a smart key). In this example, the information processing apparatus 1 is a door phone installed at an entrance of the user's home.

If a call button is pressed, the door phone displays a message "Show yourself and your ID card to the camera." on a screen and activates a camera at the door phone. The camera shoots whatever in its shooting area. Once the user and his/her ID card have been recognized from the video, the door phone displays a message "Please bring your ID card closer to the communicator of the door phone." on the screen. The camera at the door continues to shoot while the user brings his/her ID card closer to the near field communicator. The door phone analyzes the video to recognize the user bringing his/her ID card closer to the near field communicator so that the near field communicator of the door phone can perform near field communication with the ID card. If the action of the user for bringing his/her ID card closer has been recognized based on the analysis of the video, the door phone transmits, to a terminal of a manager, information acquired from an IC chip, image data of the user and his/her ID card, and an inquiry as to whether to unlock the door. The door phone unlocks the door in response to a response from the manager to indicate a permission to unlock the door. If the action of the user for bringing his/her ID card closer has not been recognized, the door phone displays a message "The action of bringing your ID card closer was not recognized." on the screen and terminates the process.

Example 4

Next, description is made of an example of the exemplary embodiments of the present disclosure in which a key is created by using the shape of the object 3 and a door is unlocked with the key. In this example, the information processing apparatus 1 is a door phone installed at an entrance of a user's home.

An IC chip prestores an identification number uniquely determined for each object. A storage of the door phone prestores information about the three-dimensional shape of the object, a facial image of the user, and an identification number. If a call button is pressed, the door phone plays a message "Show yourself and your key object to the camera." by using a loudspeaker and activates a camera at the door phone. The camera shoots whatever in its shooting area. Once the user and his/her ID card have been recognized from the video, the door phone plays a message "Please turn the object." by using the loudspeaker. The camera continues to shoot while the user turns the object. The door phone analyzes the three-dimensional shape of the object based on the video. The door phone plays a message "Please bring the object closer to the near field communicator of the door phone." by using the loudspeaker and performs near field communication with the IC chip on the object to acquire the identification number. By using the acquired identification number, the door phone acquires the prestored information about the three-dimensional shape of the object and the prestored facial image of the user. The door phone acquires a facial image of the user from the video and compares the acquired facial image against the prestored facial image of the user. Further, the door phone compares the three-dimensional shape of the object analyzed based on the video against the prestored information about the three-dimensional shape of the object. If these two comparisons each find a match, the door phone unlocks the door. If one of or both of the two comparisons find no match, the door phone plays a message "Information on you or the object did not match registered information." by using the loudspeaker and terminates the process.

The configuration of the information processing apparatus described in each of the exemplary embodiments is an example and may be changed as appropriate without departing from the gist.

The processing flow of the program described in each of the exemplary embodiments is an example and any step may be deleted, a new step may be added, or the order of processes may be changed without departing from the gist.

The information processing and the photo/video shooting executed by reading software (programs) in the CPU in each of the exemplary embodiments may be executed by various processors other than the CPU. Examples of the processor include a programmable logic device (PLD) such as a field programmable gate array (FPGA), in which the circuit structure may be changed after manufacture, and a dedicated electric circuit such as an application specific integrated circuit (ASIC), which is a processor having a dedicated circuit structure designed for execution of a specific process. The process for shooting a photo or video and the process for acquiring personal information may be executed by one of the various processors or by a combination of two or more identical or different types of processor (for example, a combination of a plurality of FPGAs or a combination of a CPU and an FPGA). More specifically, the hardware configuration of each of the various processors is an electric circuit manufactured by combining circuit elements such as semiconductor elements.

In each of the exemplary embodiments, the programs for the information process and the process for shooting a photo or video are prestored (preinstalled) in the storage 16 but may be provided by being recorded in a recording medium such as a compact disk read only memory (CD-ROM), a digital versatile disk read only memory (DVD-ROM), or a universal serial bus (USB) memory. The programs may also be downloaded from an external apparatus via a network.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus, comprising:
a processor configured to:
receive image data from a camera;
cause a display to display the image data while the image data is being received from the camera;
cause the display to display a first frame to guide a user to place a living face of the user in a first predetermined shooting area of the camera;
cause the display to display a second frame to guide a user to place a non-living target object in a second predetermined shooting area of the camera;
instruct, in response to a determination that the living face is not placed as guided, the user to place the living face as guided;
instruct, in response to a determination that the target object is not placed as guided, the user to place the target object as guided; and
instruct, in response to more than one living face being detected in the image data, the user to place only one living face; or
instruct, in response to more than one target object being detected in the image data, the user to place only one target object.

2. The information processing apparatus of claim 1,
wherein the processor is configured to determine whether the living face and the target object are in a shooting area concurrently.

3. The information processing apparatus of claim 1,
wherein the processor is configured to guide the user to place the living face and the target object in a shooting area concurrently by causing the display to display the first frame and the second frame concurrently.

4. The information processing apparatus of claim 2,
wherein the processor is configured to perform a first predetermined process in response to a determination that the living face and the target object are in the shooting area concurrently.

5. The information processing apparatus of claim 4,
wherein the first predetermined process prompts the user to reduce a distance between the target object and the information processing apparatus.

6. The information processing apparatus of claim 5,
wherein the processor is configured to enlarge the second frame when prompting the user to reduce the distance between the target object and the information processing apparatus.

7. The information processing apparatus of claim 5,
wherein the processor is configured to analyze the image data to obtain information on a surface of the target object, and
wherein the processor is configured to perform a process using information on the surface of the target object and features of the living face.

8. The information processing apparatus of claim 5,
wherein the processor is configured to prompt the user to reduce the distance between the target object and the information processing apparatus for near field communication, and
wherein the processor is configured to receive information read from an IC chip on the target object by the near field communication by a reader.

9. The information processing apparatus of claim 8,
wherein the processor is configured to analyze the image data to obtain information on a surface of the target object, and
wherein the processor is configured to perform a process using the information on the surface of the target object and the information read from the IC chip on the target object.

10. The information processing apparatus of claim 8,
wherein the processor is configured to analyze the image data to obtain information on a surface of the target object, and
wherein the processor is configured to perform a process using the information on the surface of the target object and the information read from the IC chip on the target object and features of the living face.

11. The information processing apparatus of claim 8,
wherein the processor is configured to determine whether the near field communication occurs within a predetermined time from a prompt.

12. The information processing apparatus of claim 8,
wherein the processor is configured to perform a third process in response to the near field communication occurring within a predetermined time from a prompt.

13. The information processing apparatus of claim 1,
wherein the processor is configured to perform a second predetermined process in response to a determination that the living face and the target object are not in a shooting area concurrently.

14. The information processing apparatus of claim 4,
wherein the processor is configured to perform a second predetermined process that is different from the first predetermined process in response to a determination that the living face and the target object are not in the shooting area concurrently.

15. The information processing apparatus of claim 1,
wherein the information processing apparatus is a mobile device comprising the camera and the display.

16. The information processing apparatus of claim 8,
wherein the information processing apparatus is a mobile device comprising the camera, the display, and the reader.

17. A non-transitory computer readable medium storing an information processing program causing a computer to execute a process comprising:
receiving image data from a camera;
causing a display to display the image data while the image data is being received from the camera;
causing the display to display a first frame to guide a user to place a living face of the user in a first predetermined shooting area of the camera;
causing the display to display a second frame to guide a user to place a non-living target object in a second predetermined shooting area of the camera;
instructing, in response to a determination that the living face is not placed as guided, the user to place the living face as guided;
instructing, in response to a determination that the target object is not placed as guided, the user to place the target object as guided; and
instructing, in response to more than one living face being detected in the image data, the user to place only one living face; or
instructing, in response to more than one target object being detected in the image data, the user to place only one target object.

18. A method comprising:
receiving image data from a camera;
causing a display to display the image data while the image data is being received from the camera;
causing the display to display a first frame to guide a user to place a living face of the user in a first predetermined shooting area of the camera;
causing the display to display a second frame to guide a user to place a non-living target object in a second predetermined shooting area of the camera;
instructing, in response to a determination that the living face is not placed as guided, the user to place the living face as guided;
instructing, in response to a determination that the target object is not placed as guided, the user to place the target object as guided; and
instructing, in response to more than one living face being detected in the image data, the user to place only one living face; or
instructing, in response to more than one target object being detected in the image data, the user to place only one target object.

* * * * *